United States Patent Office 3,166,667
Patented Jan. 19, 1965

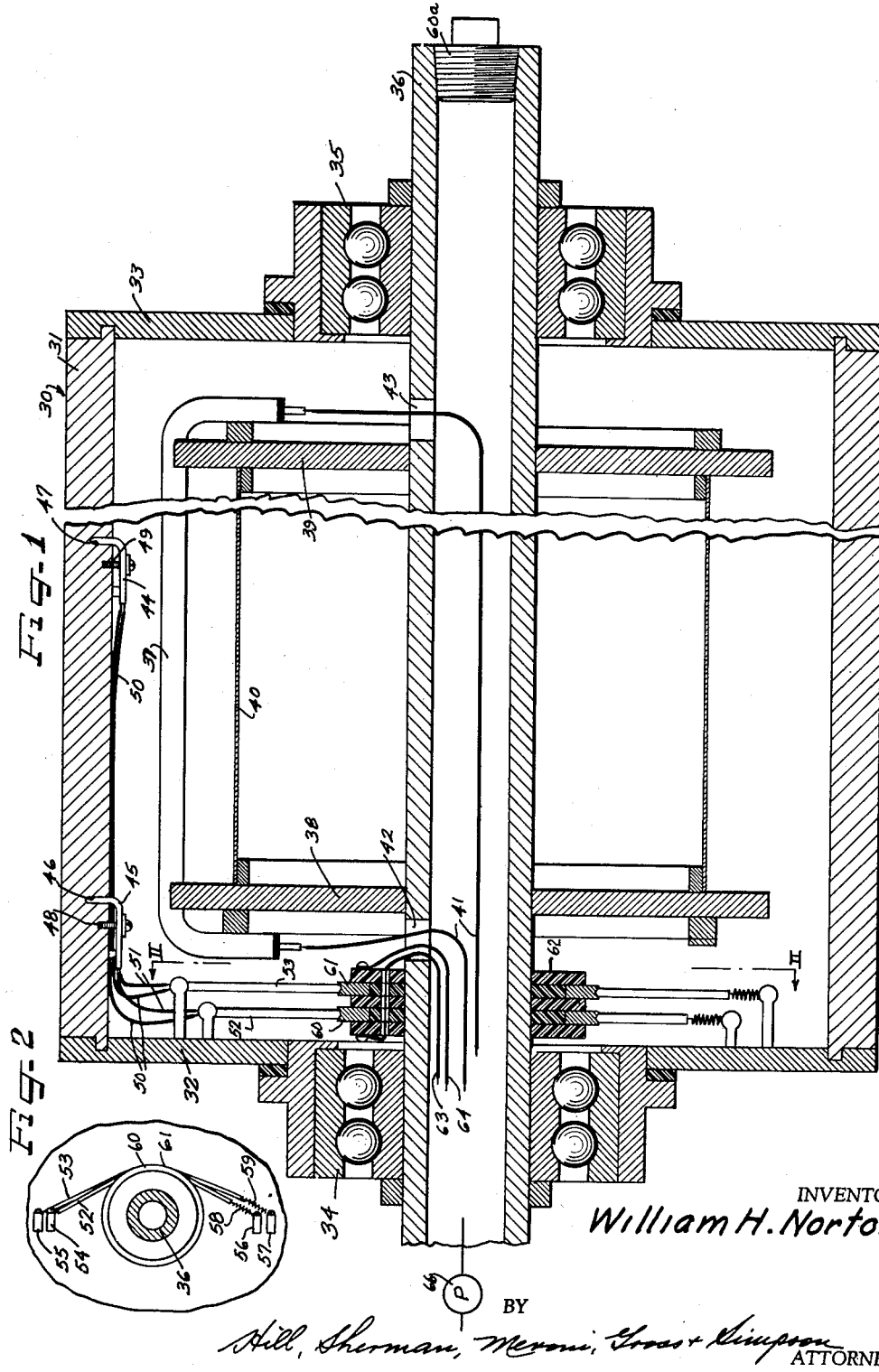

3,166,667
ELECTRICALLY HEATED ROLL WITH
ELECTRICAL CIRCUIT
William H. Norton, Mundelein, Ill., assignor to Thermel Incorporated, Franklin Park, Ill., a corporation of Delaware
Original application May 23, 1960, Ser. No. 30,971, now Patent No. 3,105,133, dated Sept. 24, 1963. Divided and this application June 3, 1963, Ser. No. 292,180
6 Claims. (Cl. 219—469)

This application is a division of application Serial No. 30,971, filed May 23, 1960, now Patent No. 3,105,133, dated September 24, 1963.

This invention relates to an improved heat transfer roll and rotary conductors therefor such as are used for transmitting electrical signals indicating temperature of the roll.

More particularly the invention contemplates use in an electrically heated hollow heat transfer roll having a cylindrical outer surface. The roll is rotatably mounted on a shaft and a heater such as electrical resistance elements are positioned within the roll supplied by electrical conductors which are controlled by a temperature sensitive switch. The invention contemplates the provision of the roll with improved means for preventing the danger of conflagration or explosion in the event of an atmosphere of explosive gas being present such as may be caused by contact of the heated roll with materials which volatilize with heat. The invention further contemplates an improved means for electrically measuring the temperature of the roll so as to effectively and accurately control the roll heater with the measuring means transmitting electrical signals which are a function of the temperature of the roll through an improved rotary conductor.

In measuring the temperature of the outer surface of the roll an electrical measuring device such as a thermocouple is well suited for continually reading the roll temperature. The electrical signal obtained from the thermocouple is fed through a rotary connection or conductor to an electrical control which is usually stationary at the end of the roll and operates to regulate the operation of the heaters for the roll. With this type of control it has heretofore been difficult to obtain very close temperature control of the roll surface since the voltage outputs of the thermocouple are very small and losses will occur in the rotary connector causing an incorrect signal to be received. These losses are difficult to control since any resistance such as which normally occurs in a slip ring type of arrangement will result in signal loss.

An object of the invention is to provide a heat transfer roll with an improved electrical heating arrangement and improved apparatus for controlling the application of heat and for safely effecting the transfer of heat; and to provide a roll in which the danger of explosions or conflagration is greatly reduced.

An object is to provide an improved means for measuring the temperature of a rotating roll and for producing an accurate electrical signal corresponding to temperature.

A further object of the invention is to provide an improved rotary conductor capable of conducting very low voltages without fluctuation due to relative rotation between touching electrical conductive members.

A further object of the invention is to provide an improved rotary conductor which has substantially zero resistance so that there is no voltage drop through the conductor, and so that the conductor is capable of conducting the very small electrical signals generated by a thermocouple on a rotating roll and transmitting them to a stationary member which varies the flow of electricity to heaters for the roll in accordance with the electrical signal received.

Other objects and advantages will become more apparent with the teaching of the principles of the invention in connection with the disclosure of the preferred embodiments in the specification, claims, and drawings, in which:

FIGURE 1 is a sectional view taken through a form of heat transfer roll; and

FIGURE 2 is a fragmentary sectional view taken substantially along II—II of FIGURE 1.

In the arrangement of FIGURES 1 and 2, a rotor assembly 30 is provided having a cylindrically shaped shell 31 which is provided with radial end walls 32 and 33. The shell is mounted by means of bearings 34 and 35 on a hollow coaxial stationary shaft 36.

Stationarily mounted on the shaft 36 and positioned within the shell 31 in heat transfer relationship thereto are axially extending tubular heating elements 37. The elements are mounted on spiders 38 and 39 which are secured to the shaft 36. Supported between the spiders is an annular reflector 40 for reflecting the heat outwardly toward the shell. Electrical wires 41 are connected to the ends of the heating elements 37 and the wires are led through openings 42 and 43 in the shaft to pass down the center of the hollow shaft 36.

The electrical circuit to the heating elements 37 is controlled by a first thermal responsive element 44 and a second thermal responsive element 45. The first element 44 is mounted to be responsive to the temperature of a shell at a first location, preferably substantially at the axial center of the shell. The second thermal responsive element 45 is axially displaced from the first element and is preferably at the end of the shell. The thermal element 45 has a probe end which projects into an outwardly drilled hole 46 in the shell and the thermal element 44 has a similar probe which projects into a drilled hole 47 in the shell. The elements are held in place such as by screws with a screw 48 threaded into the shell to hold the element 45 in place, and a screw 49 threaded into the shell to hold the element 44 in place.

The thermal responsive elements generate an electrical voltage corresponding to the temperature of the shell and are connected so that their output is an average of the outputs of the two elements 44 and 45. In other words, the elements are connected in multiple so that an average temperature response is received and a temperature between that of the center and of the cooler ends of the shell is provided for a control signal. For this purpose, the electrical wires 50 and 51 are respectively connected to the elements 44 and 45 and each set of leads are connected to two brushes 52 and 53.

The thermal sensitive elements are preferably of the thermocouple type which generate a very small electrical output in the millivolt range. The output circuit must have substantially no resistivity to it which would cause a drop in millivolts and throw off the temperature indication; however, a connector must be provided which will accommodate rotation of the shell.

The brushes 52 and 53 are in the form of an elongated wire or ribbon. The wire brushes are connected to supporting posts 54 and 55 at one end, and supporting posts 56 and 57 at the other end connect to tension springs 58 and 59 which hold the elongated brushes 52 and 53 against slip rings 60 and 61. The slip rings 60 and 61 are one-piece annular metal rings with a slight indentation in the outer surface to receive the wire brushes 52 and 53, and the slip rings are mounted on an insulating support 62, shown in the form of flat discs held together to support the rings. In other words, an electrical connector is provided including wire brush elements 52 and 53 and slip ring elements 60 and 61 with said elements being relatively rotatable and the brush elements 52 and 53 shown as mounted to rotate with the rotor assembly 30 in the preferred embodiment. Wire leads 63 and 64 connect to the rings. The support posts 54 and 55, and 56 and 57 at the ends of the wire brushes are of insulative material.

The wire leads 63 and 64 from the thermal elements will connect to a switch means for controlling the electrical supply to the leads 41 for the heating elements, similar to the connections shown in the arrangement of FIGURE 2.

As will be appreciated by those versed in the art the wire leads 63 and 64 may connect the various types of controls for regulating various types of heaters for the roll. It is important that an accurate millivolt signal be obtained which is truly representative of the temperature signal received from the roll which does not fluctuate in different rotational positions of the roll as it is rotated and which does not fluctuate with age or operating life of the mechanism. The surfaces between the wires or ribbons and the slip ring surfaces against which they engage are self-cleaning and with rotation will prevent the accumulation of any surface films or corrosive layers which would provide an electrical resistance at the point of engagement between the wire and the slip ring surfaces.

The rotating slip rings are preferably formed of a material such as bronze which is highly conductive, and which readily remains clean with the rotation of the wires. A strong steel wire such as piano wire is well suited for use for the ribbons.

Thus, it will be seen that I have provided an improved and simplified rotary electrical connector which meets the objectives and advantages above set forth. The mechanism is non-complicated for purposes of manufacture and avoids disadvantages in structures heretofore available, providing a rotary connector or conductor which is capable of handling millivolt signals without offering resistance to the flow of electricity and which transmits an accurate electrical signal with continued use.

The positive electrical connection between the relatively moving parts and the lack of resistance therebetween prevents any inadvertent sparking and also contributes to the safety and explosion-proof features of the structure.

The inside of the shell, as illustrated for example in FIGURE 1, is pressurized with a low pressure on the order of three pounds per square inch, with a non-combustible gas. As shown, one end of the shaft 36 is closed with a threaded plug 60a, and a pressure supply line from a pump 66 is connected to the other end of the shaft to deliver a gas such as air. The air pressurizes the inside of the shell through the openings 42 and 43 and the bearings 34 and 35 are such that very little of the pressure is permitted to escape. The leakage of non-combustible gas through the openings which are present prevents any outside gases from entering the shell.

The rotors may be provided with means for driving them in rotation for contact with the surface area that is to be heated or they may be used as an idler with the surface being heated rotating the rotor through friction. These structures may be employed for various heating purposes and can be used for softening thermoplastic materials to seal containers. It is also contemplated to place an embossed outer sleeve over the shell for engagement with material to etch an embossed design in it, for one use of the rotors.

Thus it will be seen that I have provided an improved and simplified electrically heated heat transfer roll which meets the objectives and advantages above set forth. The mechanism avoids disadvantages in structures heretofore available and is reliable and effective in operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A heat transfer roll comprising a cylindrically shaped shell, an electrically energized heating element stationarily mounted within the shell, a thermal sensitive element mounted for rotation with the shell and generating an electrical voltage corresponding to the temperature of the shell, a control switch means for controlling the electrical supply to said heating element, and a connector between said thermal element and said control switch means including slip ring members and relatively rotating elongated wire brush members supported at their ends with an intermediate portion in tensioned positive rubbing contact with said ring members and said ring and brush members being relatively rotatable so that a substantially negligible electrical resistance is offered by said connector and an accurate voltage will be received by the control switch means from said thermal element.

2. A heat transfer roll comprising a cylindrically shaped shell, an electrically energized heating element stationarily mounted within the shell, a thermal sensitive element mounted for rotation with the shell and generating an electrical voltage corresponding to the temperature of the shell, a control switch means for controlling the electrical supply to said heating element, and a connector between said thermal sensitive element and said control switch means including slip ring members electrically insulated from each other and connected to said thermal sensitive element and including a pair of wire brush members anchored at one end and provided with biasing means urging the brush members into sliding contact with the outer face of said ring members, said brush members and ring members being relatively rotatable, said brush members connected to said switch means and providing with the slip ring members a substantially negligible resistance so that an accurate voltage will be received by the control switch means from said thermal element.

3. A heat transfer roll comprising a cylindrically shaped shell, an electrically energized heating element stationarily mounted within the shell, a thermal sensitive element mounted for rotation with the shell and generating an electrical voltage corresponding to the temperature of the shell, a control switch means for controlling the electrical supply to said heating element, a connector between said thermal sensitive element and said control switch means structurally accommodating rotation of the shell, means for pressurizing the inside of said shell delivering a non-combustible gas under pressure thereto so that entry of outside gases into the shell and contact with the heating element is positively prevented and means closing the shell preventing the free escape of gas from within the shell, the shell interior being under a positive pressure so that said outside gases will not enter the shell.

4. A heat transfer roll comprising a cylindrically shaped shell, a stationary hollow support shaft for the shell, bearings on said shell for rotatably supporting said shell, an electrically energized heating element stationarily mounted on said shaft within the shell, a thermal sensitive element mounted for rotation with the shell and generating an electrical voltage corresponding to the temperature of the shell, a control switch means for controlling the electrical supply to said heating element, a connector between said thermal sensitive element and said control switch means structurally accommodating rotation of the shell, means defining openings through the hollow support shaft within the shell, a pressure supply connection on said shaft for directing a supply of non-combustible gas into said shaft and said shell so that entry of outside gases and contact with the heating element is positively prevented and means preventing the free escape of gas from said shaft and shell, the interior of said shell being under a positive pressure so that ambient air will not enter the shell.

5. A heat transfer roll comprising, a heater for heating said shell, an electrically energized control for controllably operating the heater, a thermal sensitive element mounted for rotation with the shell and generating an electrical voltage corresponding to the temperature of the shell, a control switch means for controlling the electrical supply to said control, and a connector between said thermal element and said control switch means including slip rings and relatively rotating elongated wire brushes supported at their ends with an intermediate portion in rubbing tensioned positive rubbing contact with said rings so that a substantially negligible electrical resistance is offered by the connector and an accurate voltage will be received by the control switch means from said thermal element.

6. A heat transfer roll comprising a cylindrically shaped shell, a stationary hollow support shaft for the shell, bearings on said shell for rotatably supporting said shell, an electrically energized heating element stationarily mounted on said shaft within the shell, a thermal sensitive element mounted for rotation with the shell and generating an electrical voltage corresponding to the temperature of the shell, a control switch means for controlling the electrical supply to said heating element, a connector between said thermal sensitive element and said control switch means structurally accommodating rotation of the shell, said connector including slip rings and elongated wire brushes in rubbing contact with said rings and being rotatable relative to the rings extending substantially tangential to the rings and provided with biasing means urging the wires into sliding contact with the face of the rings so that negligible resistance is afforded and a spark-proof engagement is provided avoiding the danger of explosion, means defining openings through the hollow support within the shell, and a pressure supply connection on said shaft for directing a supply of non-combustible gas into said shaft and said shell so that entry of outside gases and contact with the heating element is positively prevented to avoid danger of explosion.

References Cited in the file of this patent

UNITED STATES PATENTS

| | | |
|---|---|---|
| 1,978,081 | Hanson | Oct. 23, 1934 |
| 2,047,372 | Jalens | July 14, 1936 |
| 2,504,440 | Miess | Apr. 19, 1950 |
| 2,571,426 | Doniak | Oct. 16, 1951 |
| 2,881,297 | Friedman | Apr. 7, 1959 |
| 2,919,556 | Hold | Nov. 10, 1959 |

FOREIGN PATENTS

| | | |
|---|---|---|
| 309,291 | Great Britain | Apr. 11, 1929 |